United States Patent [19]

Bakal et al.

[11] Patent Number: 5,137,742
[45] Date of Patent: Aug. 11, 1992

[54] FAT-FREE AND LOW FAT MAYONNAISE-LIKE DRESSINGS

[75] Inventors: Abraham I. Bakal, Parsippany; Timothy Galbreath, Rockaway; Penny A. Cash, Denville, all of N.J.

[73] Assignee: ABIC International Consultants, Inc., Fairfield, N.J.

[21] Appl. No.: 651,652

[22] Filed: Feb. 6, 1991

[51] Int. Cl.⁵ ............................................... A23L 1/24
[52] U.S. Cl. .................... 426/589; 426/605; 426/613; 426/658; 426/661; 426/804
[58] Field of Search ............... 426/589, 605, 658, 804, 426/661, 613

[56] References Cited

U.S. PATENT DOCUMENTS

| | | |
|---|---|---|
| 2,801,242 | 7/1957 | Kerr et al. .......................... 426/568 |
| 3,023,104 | 2/1962 | Battista ............................... 426/549 |
| 3,573,058 | 3/1971 | Tiemstra ............................. 426/658 |
| 4,308,294 | 12/1981 | Rispoli et al. ....................... 426/613 |
| 4,423,084 | 12/1983 | Trainor et al. ..................... 426/589 |
| 4,596,715 | 6/1986 | Ballard et al. ...................... 426/589 |
| 4,734,287 | 3/1988 | Singer et al. ....................... 426/605 |
| 4,911,946 | 3/1990 | Singer et al. ....................... 426/658 |

FOREIGN PATENT DOCUMENTS 51-51564 5/1976 Japan .

OTHER PUBLICATIONS

Whistler, R. L. and Paschall, E. F., 1967, "Starch: Chemistry and Technology", vol. 2, Academic Press, New York, p. 79.

Primary Examiner—Joseph Golian
Assistant Examiner—Evan Federman
Attorney, Agent, or Firm—Steinberg & Raskin

[57] ABSTRACT

Fat-free and low fat mayonnaise-like dressings are provided wherein, in addition to water, a food acceptable acid such as vinegar, and an edible fat, if desired, insoluble particles of uncooked rice starch having a particle size of between about 1-15 microns are included. The rice starch particles provide opacity and fat mimetic properties with the desired mouthfeel required for mayonnaise-like dressings.

9 Claims, No Drawings

FAT-FREE AND LOW FAT MAYONNAISE-LIKE DRESSINGS

BACKGROUND OF THE INVENTION

There has been and continues to be a need for products having either a low fat content or no fat at all. This need has been demonstrated by the recent market introduction of a variety of fat-free products, including fat-free cakes, fat-free and low fat frozen desserts, and ice creams, and fat-free pourable salad dressings.

Mayonnaise, and mayonnaise-like dressings typically contain high amounts of fat. For example, real mayonnaise, contains about 80% fat or 11 g of fat per typical one tablespoon (14 g) serving. The so called "light" mayonnaise products which have been marketed in recent years also contain approximately 36% fat or 5 g of fat per one tablespoon serving. These products typically employ starch as thickeners and texturizers.

Most recently, there has been significant interest in oil-free mayonnaise-like dressing, or what is referred to in the art as spoonable dressings. In order to meet the claim of being fat-free, the products must contain less than 0.5 g of fat per tablespoon (14 g) serving.

However, as is well known to those skilled in the art, there are major problems associated with the production of acceptable fat-free or low fat mayonnaise-like dressings, including the need to impart the creamy mouthfeel associated with the high fat content of real mayonnaise, and the lack of opacity normally associated with those products which contain 3% fat or less.

The patent literature describes several approaches to the production of fat-free and low fat products. For example, U.S. Pat. No. 4,734,287, describes a water-dispersible macrocolloid of whey protein having a mean particle size distribution ranging from about 0.1 to 2.0 microns. The patent further specifies that the total number of particles exceeding 3.0 microns in diameter should be less than 2%. The production of mayonnaise dressings using the teachings of this patent have between 160 and 120 calories per 100 g, about 14% protein and 2% fat.

However, as is also well known to those familiar with the art, protein-containing products are not sufficiently stable and cannot provide the shelf-life requirements of such products and the low pH of the same which is typically about 3.8. In addition, protein-based products of this type also exhibit flavor problems and involve the use of expensive ingredients. U.S. Pat. No. 4,510,166, describes the use of converted starches as fat or oil replacers in products such as mayonnaise. However, as set forth therein, the starches used must be cooked prior to their utilization and are effective only partially as fat replacers in products such as mayonnaise.

SUMMARY OF THE INVENTION

It is accordingly a primary object of the present invention to provide fat-free and low fat mayonnaise-like dressings which avoid the difficulties of the previously known mayonnaise substitutes.

It is another object of the present invention to provide fat-free and low fat mayonnaise-like dressings which are stable and have sufficient shelf-life for commercial use.

It is yet another object of the present invention to provide fat-free and low fat mayonnaise-like dressings with the opacity, mouthfeel and flavor of ordinary mayonnaise.

Other objects and advantages of the present invention will be apparent from a further reading of the specification and of the appended claims.

With the above and other objects in view, the present invention mainly comprises fat-free and low fat mayonnaise-like dressings which comprise water, an acid such as vinegar, and insoluble particles which remain insoluble after processing to the mayonnaise-like dressing and which have a particle size distribution of between about 1–15 microns, preferably between about 3–10 microns. In accordance with the present invention, these insoluble particles mainly consist of native, uncooked, rice starch.

The amount of the insoluble particles used in the mayonnaise-like dressings of the present invention is between about 1–10% by weight, preferably between about 1–7% by weight. It is possible to substitute a portion of the uncooked rice starch insoluble particles with other non-proteinaceous particles, namely, ungelatinized starch, cellulose or modified cellulose. However, the use of the uncooked rice starch of the particle size set forth above is required to achieve the desired characteristics for the mayonnaise-like dressings of the present invention.

The amount of water used in the composition is between about 50–85% by weight, most preferably 55–80% by weight.

As indicated, the insoluble rice starch particles are present in an amount of about 1–10% by weight, preferably 1–7% by weight.

The acid such as vinegar should be present in an amount of about 2–14% by weight, preferably about 2–10% by weight.

In the place of vinegar, either wholly or in part, it is possible to use other edible acids such as citric acid, fumaric acid, tartaric acid, malic acid, gluconic acid, etc. Most preferred, however, is vinegar which contains acetic acid, and most preferred is 50 grain vinegar which corresponds to vinegar containing 5% acetic acid.

The mayonnaise-like dressings of the present invention preferably are fat-free. However, it is possible to incorporate an edible fat in the dressing in an amount up to 20% by weight, and if it is desired to include edible fat in the dressing, then the amount is preferably between about 1–15% by weight.

The mayonnaise-like dressing of the present invention can also include other components such as instant or cook-up starch (either modified or unmodified), in an amount up to about 12% by weight, preferably up to about 10% by weight. Furthermore, thickeners such as gums can be added in an amount of up to about 4% by weight, preferably up to about 2% by weight.

Still further, whole egg or egg yolk can be added in an amount of up to about 5% by weight, preferably, up to about 3% by weight, this referring to dry weight.

Salt may also be included as desired in an amount of up to about 3% by weight, preferably up to about 2% by weight. Still further, preservatives and flavors can be added as needed.

The edible fat used in the composition, if used, may be soy bean oil, cottonseed oil, sunflower oil, rape seed oil, etc.

The use of the instant or cook-up starch (modified or unmodified), the latter being gelatinized, serves as a thickener and also to improve the mouthfeel of the product. The thickeners such as gums, including carrageenan, xanthan, guar, cellulose gum, tamarind, etc., also provide thickening so as to adjust the consistency of the composition as desired.

It has been found in accordance with the present invention that the native, uncooked, rice starch, as an ingredient in the fat-free or low fat mayonnaise-like products of the invention, provides unique properties in that it has both fat mimetic properties and provides the desired opacity. These properties are achieved by using the uncooked rice starch in the particle size as set forth above, namely, between about 1-15 microns, preferably between about 3-10 microns and most preferably between about 4-6 microns. Other uncooked starches such as corn, potato, tapioca, wheat, etc., provide the opacity, but when used in the preparation of mayonnaise-like dressings result in a gritty and unacceptable product.

While opacity in compositions can be achieved by the use of titanium dioxide, the use thereof for this purpose is generally not considered to be acceptable, particularly where it is desired to provide natural products. While cellulose may be used to act as an opacifier, it does not provide the fat mimetic properties nor the mouthfeel needed to give the product the desired characteristics. These desired characteristics can only be obtained by the use of the rice starch in accordance with the present invention.

DESCRIPTION OF PREFERRED EMBODIMENTS

The following examples are given to further illustrate the present invention. The scope of the invention is not, however, meant to be limited to the specific details thereof.

EXAMPLE 1

A number of substantially fat-free mayonnaise-like dressings were prepared using the ingredients and procedure described below. This system employs a cook-up starch as the thickener and texturizer.

| | Composition (5) | | | |
|---|---|---|---|---|
| Ingredient | #1 | #2 | #3 | #4 |
| Water | 78.8 | 73.8 | 76.8 | 73.8 |
| Sugar | 2.5 | 2.5 | 2.5 | 2.5 |
| Salt | 1.4 | 1.4 | 1.4 | 1.4 |
| Vinegar (50 grain) | 7.0 | 7.0 | 7.0 | 7.0 |
| Modified food starch (cook-up) | 5.0 | 5.0 | 7.0 | 5.0 |
| Vegetable oil | 2.0 | 2.0 | 2.0 | 2.0 |
| Egg yolk powder | 0.4 | 0.4 | 0.4 | 0.4 |
| Flavors | 0.9 | 0.9 | 0.9 | 0.9 |
| Color concentrate | 1.8 | 1.8 | 1.8 | 1.8 |
| Preservatives | 0.2 | 0.2 | 0.2 | 0.2 |
| Rice starch (native) | — | — | — | 5.0 |
| Matodextrin (10 DE) | — | 5.0 | — | — |

| | Quality Attributes | | |
|---|---|---|---|
| Sample # | Opacity | Apparent Viscosity | Taster Mouthfeel |
| 1 | Translucent | Watery | Thin |
| 2 | Translucent | Watery, slightly sweet | Thin/slightly thicker |
| 3 | Translucent | Pasty and stringy | Thick and pasty |
| 4 | Opaque, similar to control | Creamy, excellent, similar to control | Slightly thinner than control |

The samples described above were stored at room temperature for a period of over six weeks and evaluated thereafter. Sample 4 retained its creamy mouthfeel and general appearance which is similar to the commercial product. Samples 1 through 3 retained their unacceptable characteristics.

EXAMPLE 2

A series of fat-free mayonnaise-like dressings were prepared with the objective of evaluating the performance of insoluble ingredients other than rice starch. The methodology used was described in Example 1 for sample #4. The composition was the same as sample #4 with the exception that the rice starch was replaced with one of the following ingredients:

1. Microcrystalline cellulose (Avicel pH 105) with an average particle size of 20 microns. This grade is recommended by the manufacturer for use as an opacifier.
2. Cellulose powder (Solka Floc BW 300) with an average particle size of 22 microns.

The samples were compared to sample #4 of Example 1. These two samples were somewhat opaque but the color and general appearance was not typical of mayonnaise. Both samples were judged as sandy and gritty and had no creamy mouthfeel.

In an attempt to overcome the sandiness, the products were passed several times (5 times) through the colloid mill. However, the products retained their sandy and gritty mouthfeel.

EXAMPLE 3

Several samples of fat-free mayonnaise were prepared using an alternate thickening system consisting of Avicel thickener (Avicel type CL 611 consisting of 85% microcrystalline cellulose and 15% cellulose gum), xanthan gum and pregelatinized modified starch. The purpose of this test was to compare the performance of native ungelatinized rice starch to other ungelatinized starches derived from sources other than rice. The basic composition used and preparation procedure are described below:

| Ingredient | Percent |
|---|---|
| Avicel CL 611 | 2.50 |
| Xanthan gum | 0.35 |
| Salt | 1.40 |
| Sugar | 2.50 |
| Vinegar | 7.00 |
| Egg yolk powder | 0.50 |
| Pregelatinized modified starch | 2.50 |
| Vegetable oil | 2.80 |
| Pregelatinized starch | 1.00 |
| Flavors | 0.30 |
| Colors | 2.00 |
| Preservatives | 0.25 |
| Ungelatinized starch* | 5.00 |
| Water | 71.90 |

*The starches evaluated included rice, potato, wheat, tapioca, and corn.

The Avicel and xanthan gum were slowly added to the water and vinegar and mixed vigorously for about 15 minutes or until these ingredients were fully hydrated. All other ingredients, except the oil, were dry blended and added to the Avicel/xanthan gel while mixing. After all ingredients were added and hydrated, the oil was added gradually while mixing. The mass was then passed through a colloid mill and packed.

The samples employing the various starches were evaluated and compared to the sample containing the rice starch. Except for the rice starch-containing sample, all other starches resulted in a gritty and sandy product lacking the creaminess and mouthfeel of mayonnaise.

EXAMPLE 4

Two samples of fat-free mayonnaise were prepared using the teachings of the invention and combining cellulose gel and cook-up starch. One sample contained no added vegetable oil, another contained 1.8% added vegetable oil. The composition and preparation procedures follow:

| | Percent | |
|---|---|---|
| Ingredient | #1 | #2 |
| Avicel CL-611 | 0.50 | 0.50 |
| Xanthan gum | 0.05 | 0.05 |
| Salt | 1.40 | 1.40 |
| Sugar | 2.50 | 2.50 |
| Vinegar | 7.00 | 7.00 |
| Egg yolk powder | 0.50 | 0.50 |
| Ungelatinized modified starch (cook-up) | 5.50 | 5.50 |
| Instant starch | 1.00 | 1.00 |
| Vegetable oil | — | 1.80 |
| Ungelatinized rice starch | 4.00 | 4.00 |
| Color concentrate | 2.00 | 2.00 |
| Flavor | 0.80 | 0.80 |
| Preservatives | 0.20 | 0.20 |
| Water | 74.55 | 72.55 |

A portion of the water (about 50%) and all the vinegar were added to the cook-up modified starch and other dry ingredients with the exception of the Avicel, xanthan gum, the rice starch and the flavors. The mixture was cooked to 180° F. and the temperature maintained until the starch was totally gelantinized. This mixture was then cooled to room temperature. In another container, the Avicel and xanthan gum were hydrated with the remaining water while vigorously mixing. To the hydrated gums, the rice starch was added. This gel was then added to the cold mass described above. The oil (when present) and colors were gradually added while mixing. The final mix was passed through colloid mill and the final product packed.

Sample 1 contained no fat and had approximately 65 calories per 100 grams or 9 calories per a 14 g serving. Sample 2 contained 1.8% fat and had approximately 80 calories per 100 gram or approximately 11 calories per 14 g serving. These compare to about 36% fat and 50 calories per 14 g serving for currently available commercial light mayonnaise.

While the invention has been illustrated with respect to particular examples, it is apparent that variations and modifications can be made without departing from the spirit or scope of the invention.

What is claimed is:

1. Fat-free or low fat dressing composition having the appearance, consistency and taste characteristics of mayonnaise, said composition comprising water, a food acceptable acid, an edible fat in an amount of up to about 20% by weight, and insoluble particles of native, uncooked and ungelatinized rice starch having a particle size of between about 1-15 microns in an amount between about 1-10% by weight.

2. Composition according to claim 1 wherein said food acceptable acid is vinegar.

3. Composition according to claim 1 wherein the amount of said insoluble particles of uncooked rice starch is between about 1-7% by weight.

4. Composition according to claim 1 wherein the particle size of said insoluble particles is between about 3-10 microns.

5. Composition according to claim 3 wherein the particle size of said insoluble particles is between about 3-10 microns.

6. Composition according to claim 1 wherein the amount of water is between about 50-85% by weight.

7. Composition according to claim 1 wherein the amount of water is between about 50-85% by weight.

8. Composition according to claim 6 and also including instant starch or cook-up starch in an amount of up to 12% by weight, thickeners in an amount of up to 4% by weight, whole egg or egg yolk in an amount of up to 5% by weight, and salt, preservatives and flavors.

9. Composition according to claim 1 wherein said composition is low-fat and contains between about 1-15% by weight of an edible fat.

* * * * *